Feb. 21, 1961 J. F. BERTSCH 2,972,340
COOLING AND AIR SUPPLY SYSTEM FOR INTERNAL
COMBUSTION ENGINES
Filed Oct. 1, 1959 5 Sheets-Sheet 1
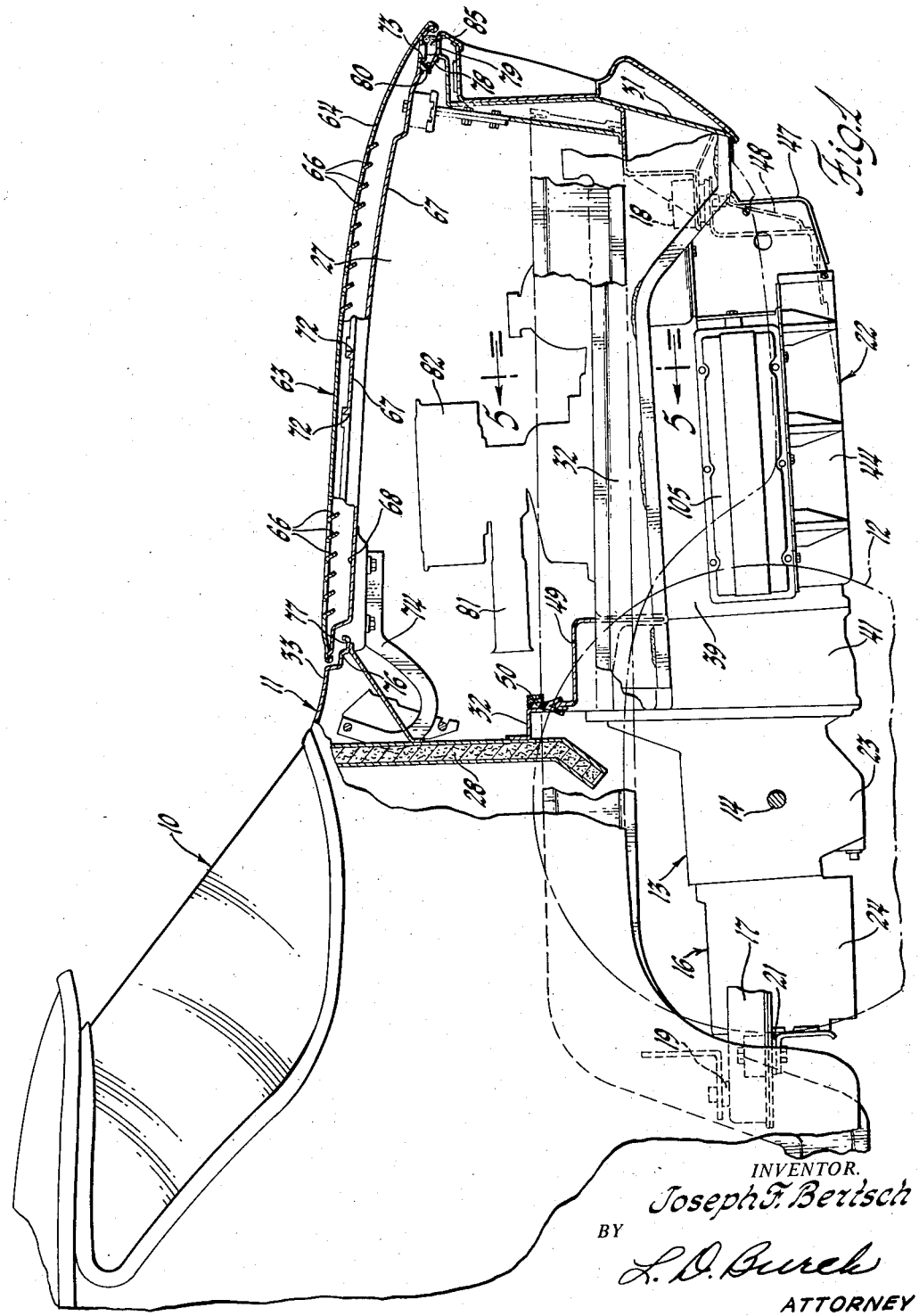
INVENTOR.
Joseph F. Bertsch
BY
L. D. Burek
ATTORNEY

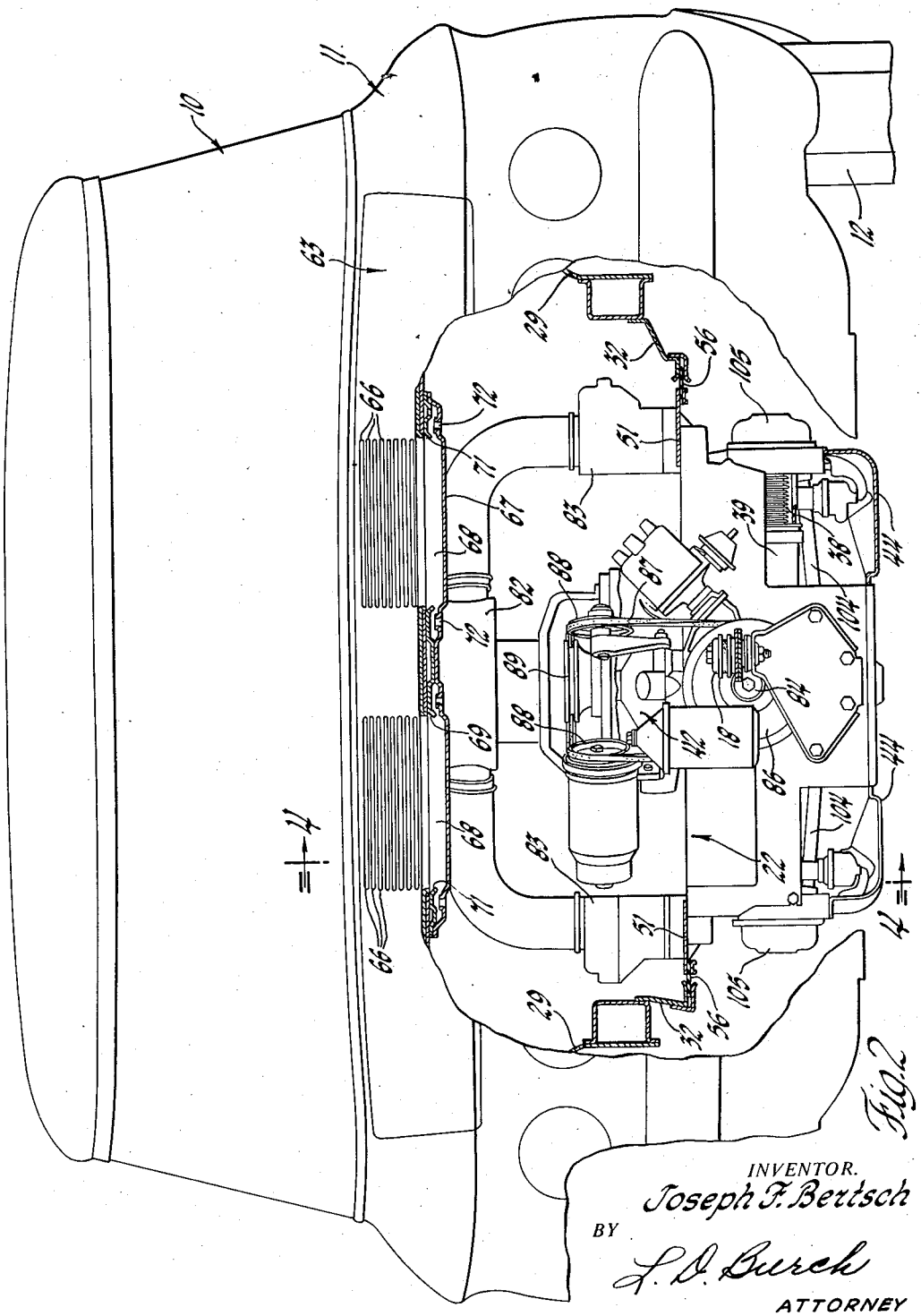

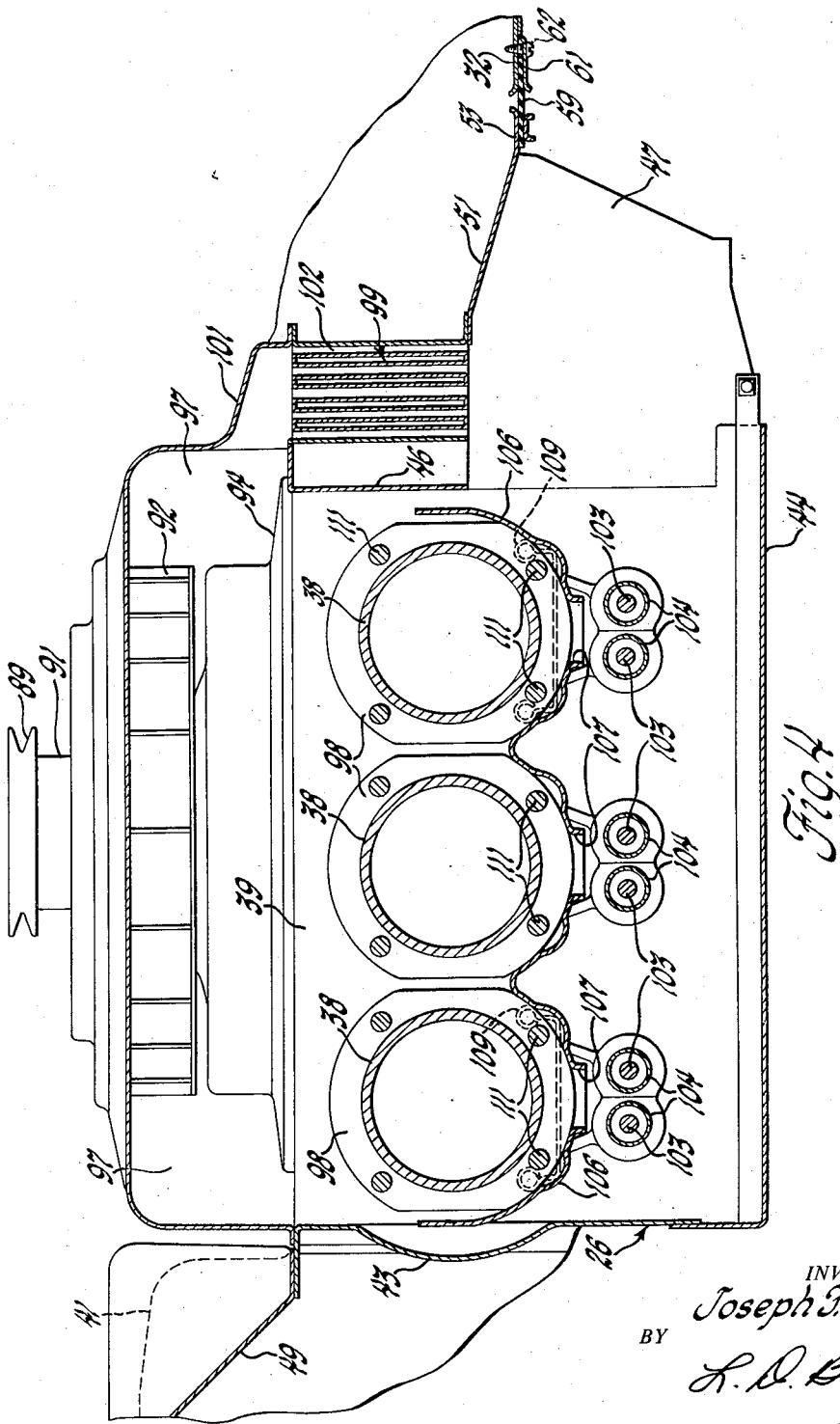

Feb. 21, 1961    J. F. BERTSCH    2,972,340
COOLING AND AIR SUPPLY SYSTEM FOR INTERNAL
COMBUSTION ENGINES
Filed Oct. 1, 1959    5 Sheets-Sheet 5
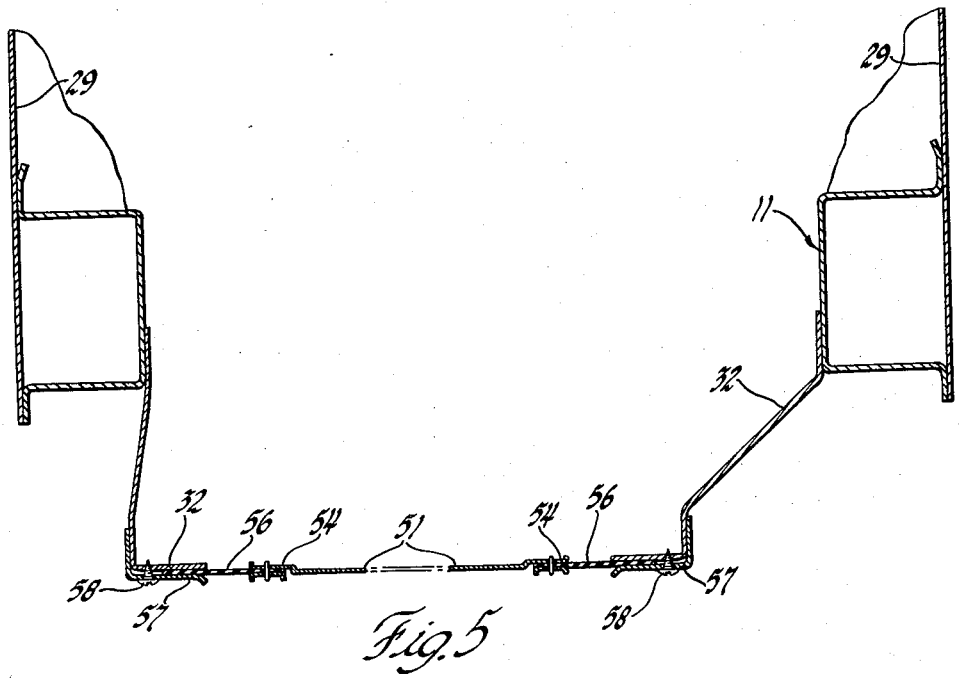
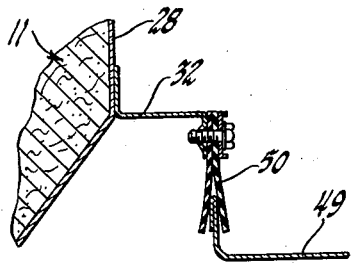
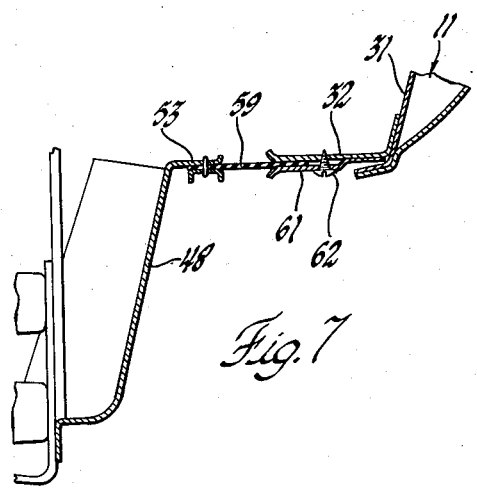
INVENTOR.
Joseph F. Bertsch
BY
L. D. Burch
ATTORNEY United States Patent Office 2,972,340
Patented Feb. 21, 1961

2,972,340

COOLING AND AIR SUPPLY SYSTEM FOR INTERNAL COMBUSTION ENGINES

Joseph F. Bertsch, Detroit, Mich., assignor to General Motors Corporation, Detroit, Mich., a corporation of Delaware Filed Oct. 1, 1959, Ser. No. 843,736

4 Claims. (Cl. 123—41.7)

This invention relates to cooling and air supply systems for internal combustion engines, particularly for air cooled internal combustion engines employed in driving motor vehicles and for other purposes.

The system is embodied in a motor vehicle having an air cooled engine in the rear of the vehicle where a relatively air tight compartment is provided for supplying air to the engine and for cooling the engine. The compartment is provided with an opening for receiving the upper part of the engine from beneath the vehicle, the opening being sealed between the engine and the vehicle to prevent dust and dirt from the road from entering the compartment. The engine is also enclosed in a casing having an inlet communicating with the compartment and an outlet beneath the vehicle and at the rear of the vehicle. The casing provides a plenum chamber for distributing air for cooling the engine. The casing also partly encloses a blower having an inlet communicating with the compartment and supplying air to the plenum chamber for cooling the engine. The blower is mounted on top of the crankcase of the engine and has an axis of rotation normal to the axes of the cylinders of the engine. In the present instance the cylinders project outwardly from each side of the crankcase. The cylinders and heads of the engine are finned to provide for increasing the cooling effect of the air circulating over the cylinders. The engine also has means whereby much of the cooling of the engine is accomplished by cooling the oil for lubricating the engine. The engine has a configuration which facilitates the circulation of air for cooling the engine and has baffles disposed internally of the casing which also direct the air in the casing to the parts of the engine where the cooling of the engine may be most effective.

In the drawing:

Figure 1 is a fragmentary view, partly in elevation and partly in cross section of a motor vehicle embodying a cooling and air supply system embracing the invention.

Figure 2 is a rear end elevational view of the vehicle illustrated by Figure 1 and having parts broken away and shown in cross section and showing a rear end view of the engine in which the cooling system is employed.

Figure 3 is an exploded perspective view of the engine and the duct work forming a casing surrounding the engine and providing means whereby air is effectively circulated over the engine.

Figure 4 is a vertical sectional view through the engine and the casing surrounding the engine and illustrating the air circulating features of the cooling system embodying the invention. Figure 4 is taken substantially in the plane of line 4—4 on Figure 2, looking in the direction of the arrows.

Figure 5:
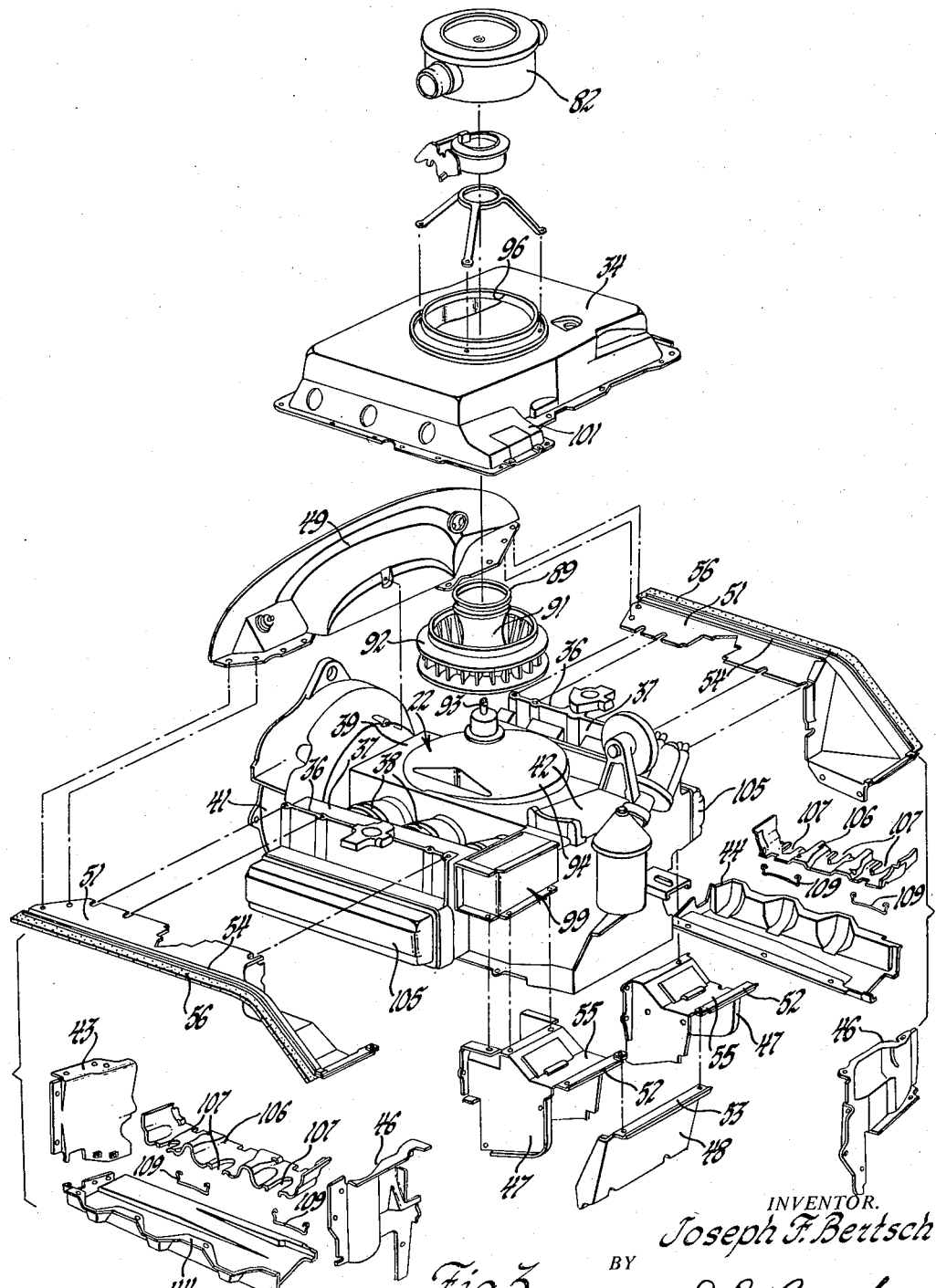

Figure 5 is a fragmentary cross sectional view of the motor vehicle illustrated by Figures 1 and 2 and with the central part of the vehicle and the engine and the casing around the engine broken away and removed and with remaining parts brought closer together to better illustrate the sealing of the compartment supplying the air for cooling and for operating the engine. Figure 5 is taken substantially in the plane of line 5—5 on Figure 1, looking in the direction of the arrows.

Figure 6 is a fragmentary cross sectional view of the sealing means employed in sealing the front of the compartment between the engine and the vehicle body.

Figure 7 is a view at the rear of the vehicle and illustrating the sealing of the compartment between the engine and the vehicle body.

The motor vehicle 10 has a body 11 supported by ground wheels 12 and a power train 13 which is disposed in the rear of the vehicle and which drives the rear ground wheels through axles 14. The power train 13 forms a part of a traction unit 16 which employs a cross member 17 carrying the rear ground wheels of the vehicle. The power train is removable from the body by disconnecting mountings 18 and 19 by which the traction unit 16 is secured to the frame members of the body 11. The power train also may be removed from the traction unit and the body by detaching the mounting 18 and a pair of mountings 21 by which the front of the power train is secured to the cross member 17. The power train 13 comprises an internal combustion engine 22, a differential 23, and a transmission 24, the engine, differential and transmission all being rigidly secured together to provide a beam structure capable of being suspended beneath the vehicle on the mountings 18 and 21. The engine 22 has a shroud or casing 26 thereabout for controlling the circulation of air for cooling the engine. When the power train is installed the upper part of the engine 22 is projected upwardly through an opening in the body and into a rear compartment 27 which is employed in supplying air for operating the engine and the cooling system of the engine.

The compartment 27 is formed by a heat and sound insulating front wall 28, a pair of side walls 29, a rear wall 31, a lower wall 32 and an upper wall 33. The lower wall 32 has an opening therein for receiving the upper part of the engine 22 with the shroud or casing 26 assembled thereon. The casing 26 may include an upper wall or cover 34 which may be secured by bolts or other suitable means to outer walls 36 that are formed on the heads 37 that close the outer ends of the cylinders 38 of the engine 22. The cylinders 38 are air cooled cylinders which project in opposite directions from the crankcase 39 of the engine. The front end of the crankcase 39 supports a clutch housing 41 to which the differential 23 is secured. The rear end of the crankcase supports an accessory housing 42 containing and supporting the accessories of the engine and the driving means therefor. The front edge of the upper wall 34 is secured to the front end of the crankcase 39 adjacent the housing 41 while the rear edge thereof is secured to the rear end of the crankcase 39 adjacent the housing 42.

The casing 26 also includes front end walls 43 enclosing the space at the front of the rows of cylinders 38 and between the ends of the walls 36 and the crankcase 39. The lower part of the spaces on each side of the crankcase 39 and between the crankcase and the lower edges of the walls 36 is enclosed by lower walls 44. The spaces at the rear ends of the rows of cylinders 38 are closed by upper end walls 46 and lower casing outlets 47, all being secured between the rear end of the crankcase walls 36, and the lower walls 44. A shield 48 is disposed between the outlets 47 at the rear of the engine. The housing 26 is also provided with a front extension wall 49 and two side extension walls 51. The front extension wall is secured to the engine beneath the front edge of the cover 34 while the side extension walls are secured to the edges of the walls 36 beneath the side edges of the cover 34. The outlets 47 have upper walls 55 with ledges 52 projecting therefrom and the shield 48 has a similar ledge 53 that extends between and is aligned with the ledges 52. The upper grooved edge of the front extension wall 49 is adapted to project between the lips of a sealing strip 50 that is secured to a flanged edge of the part of the lower wall 32 at the front of the compartment. The outer edges of the side extension walls 52 are also formed to provide ledges 54 to which sealing strips 56 are secured. The sealing strips 56 are adapted to extend within slots formed between the lower surfaces of the side parts of the lower wall 32 and clamping strips 57. The clamping strips are adapted to be removably secured to the side parts of the lower wall 32 by sheet metal screws 58. The ledges 52 and 53 on the outlets 47 and the shield 48 also are adapted to support sealing strips 59 which project rearwardly therefrom. The strips 59 are also adapted to be secured in slots formed between the lower surface of the rear part of the lower wall 32 and a securing strip 61. The securing strip 61 is adapted to be removably secured to the rear part of the wall 32 by sheet metal screws 62. The securing strips 57 and 61 should be removed before the engine part of the power train 13 is projected upwardly into the compartment 27. Then, the upper grooved edge of the front extension wall 49 may be projected between the lips of the sealing strip 50 and the sealing strips 56 and 59 will extend outwardly from the side extension walls 51, from the outlets 47 and the shield 48 and will engage the lower surfaces of the side and rear parts of the lower wall 32. The securing strips 57 then may be secured to the sides of the lower wall by the sheet metal screws 58, thereby clamping the outer edges of the sealing strips 56 securely between the lower surfaces of the side parts of the lower wall 32 and the strips 57. The securing strips 61 may be secured by the screws 62 to the rear part of the lower wall 32 to clamp the outer edge of the sealing strip 59 in sealing position. With the sealing strips 56 and 59 so disposed between the assembled parts of the engine and the lower wall 32 of the compartment 27 it will be apparent that the compartment 27 will be sealed against entry of dust and dirt from the road.

The upper part of the compartment 27 is adapted to be closed by a deck lid 63. The deck lid 63 may include an outer wall 64 with rows of louvres 66 therein. The louvres are enclosed on the inside of the wall 64 by an inner wall 67 which is spaced from the louvres 66 and the outer wall 64 to provide drainage passages 68. A center baffle 69 and two side baffles 71 are secured between the outer wall 64 and the inner wall 67 to shield outlet passages 72 in the inner wall 67 that extends substantially throughout the length of the rows of louvres 66. When air containing water enters the louvres 66 it will flow laterally in the passages 68 to the outlets 72 where the moisture will be separated from the air by the baffles 71. The moisture will flow downwardly in the passages 67 to the lower extremities of the passages 68 which terminate in openings 73. The deck lid 63 is hinged at the front at 74, so that it may be raised upwardly at the rear end. The upper wall 33 of the compartment 27 is formed around the edges of the opening receiving the deck lid 63 to provide ledges 76 that extend beneath the edges of the deck lid. The ledges at the upper end and sides are formed to provide troughs or channels 77 that are adapted to drain water that may enter the compartment 27 around the front and side edges of the deck lid 63 toward the ledge 78 at the rear of the opening. The ledge 78 is formed to slope downwardly toward the rear of the vehicle and has a flanged front edge 79. The water collected by the grooves or channels 77 will flow outwardly across the ends of the ledge 78 and outwardly over the rear of the body 11. The openings 73 are disposed above the ledge 78 and beyond the flange 79 so that the water collected in the passages 68 also will flow downwardly over the ledge 78 and outwardly over the rear of the vehicle. The deck lid carries a rubber or other suitable sealing strip 80 that engages the front edge of the flange 79 along the part of the deck lid where the passages 68 are formed. This prevents water discharged by the openings 73 upon the ledge 78 from being drawn inwardly of the ledge and into the compartment 27. The rear end of the deck lid 63 is supported at each side thereof by rubber or other suitable bumpers or pads 85 that are adapted to engage the ledge 78 adjacent the ends of the ledge.

The engine 22 has the usual induction, lubrication, ignition and other systems common to internal combustion engines. The induction system includes an inlet 81 leading to an air cleaner 82 which supplies air to a pair of carburetors 83 communicating with inlet manifold passages formed in the heads 37 for the cylinders 38 of the engine. It will be apparent that the inlet 81 will receive clean and dry air from the compartment 27.

The engine 22 also has the usual crankshaft 84 connected by connecting rods to the pistons for the cylinders 38. The rear end of the crankshaft 84 supports a pulley 86 driving a belt 87 that spans idler pulleys 88 supported on the rear end housing 42. The idler pulleys 88 turn the belt 87 approximately 90°, so that it will also span a pulley 89 on the hub part 91 of a blower 92. The blower 92 is mounted on a shaft 93 that is secured in the upper wall 94 of the crankcase 39. The inlet for the blower is disposed in an inlet opening 96 in the cover 34, the blower outlet being beneath the cover and discharging air radially outwardly into a plenum chamber 97 formed across the upper wall 94 of the crankcase 39 and across the space above the rows of cylinders 38. The air discharged into the plenum chamber 97 will create an above atmospheric pressure in the plenum chamber and will cause air to flow downwardly through the rows of cylinders 38 and in contact with fins 98 projecting outwardly from the heads 37 and the cylinders 38. The front end walls 43 and the lower walls 44 will cause the air to flow outwardly of the casing 26 through the outlets 47, and below the lower wall 32 of the compartment 27.

The lubricating system for the engine 22 also includes an oil cooler 99 which is secured to the rear end of the crankcase and projects outwardly on one side of the engine beyond one of the upper rear end walls 46 of the housing 26. The cover 34 is depressed outwardly at 101 above the oil cooler 99 so that air from the plenum chamber 97 will enter the passages 102 which extend through the oil cooler 99 to the one of the outlets 47 that is directly beneath the oil cooler 99. The oil cooled by the oil cooler 99 will be circulated throughout the engine to lubricate and cool the moving and other parts of the engine. The cylinders 38 also have valves in the heads 37 for controlling the inlet and exhaust passages leading to and from the cylinders 38. The valves have rocker arms adapted to be operated by push rods 103 which extend through push rod conduits 104 connecting rocker arm compartments within the covers 105 to the crankcase 39 of the engine. The lubricating system provides oil for lubricating the valve actuating mechanism within the covers 105 and this oil is adapted to drain from the covers to the crankcase through the push rod conduits 104. In order to cool the oil returned to the crankcase through the push rod conduits 104 and to improve the cooling of the cylinders 38 it is proposed to employ baffles 106 that will extend around the lower parts of the cylinders immediately adjacent the outer edges of the fins of the cylinders. The baffles 106 have outlets 107 from the space between the fins, the outlets being disposed directly above and in front of the push rod conduits 104. The baffles 106 also extend upwardly at the sides of each row of cylinders to insure that the air flowing through the rows of cylinders will traverse the fins on the sides of the cylinders opposite the plenum chamber 97. The baffles 106 are held in position by spring fasteners 109 that engage pairs of bolts 111 on the lower sides of the cylinders that are employed in securing the cylinders to the crankcase 39. The air so circulated by the baffles 106 will be discharged by the outlets directly on the push rod conduits 104 for improving the cooling of the cylinders 38 and the heads 37 and for cooling the oil returning from the rocker arm compartments to the crankcase 39.

I claim:
1. A cooling system for an internal combustion engine having a lubricating system and having a crankcase and a cylinder projecting from said crankcase and with said cylinder having a head having an outer wall supporting the valve actuating mechanism for said cylinder and intersecting the axis of said cylinder and having a valve actuating mechanism chamber disposed outwardly of said wall and enclosing said valve actuating mechanism for said cylinder and having push rod enclosing and oil return conduit means extending between said valve actuating mechanism chamber and said crankcase and comprising, a blower having an air inlet and an air outlet and having an axis of rotation disposed transversely to the axis of said cylinder, a shroud extending over said blower and said cylinder and being formed to provide an inlet for said blower inlet and enclosing said blower outlet and said cylinder and being secured to one edge of said outer wall and one side of said crankcase and providing a plenum chamber between said blower and said cylinder and distributing air over said head and said cylinder, a baffle enclosing the side of said cylinder opposite said plenum chamber and having an outlet disposed to discharge air on said oil return conduit means, said outer wall and said crankcase and said shroud being disposed to direct air from said plenum chamber over said head and said cylinder and into said baffle and around said cylinder and through said outlet and on said oil return means, and means for driving said blower for supplying air to said plenum chamber for cooling said head and said cylinder and said oil return conduit means.

2. A cooling system for an internal combustion engine having an air induction system having an inlet and having a crankcase and a cylinder projecting from said crankcase and receiving air from said induction system for operating said cylinder and comprising, a blower having an air inlet and an air outlet and having an axis of rotation disposed transversely to the axis of said cylinder, a shroud extending over said blower and said cylinder and being formed to provide an inlet for said blower inlet and enclosing said blower outlet and said cylinder and providing a plenum chamber between said blower and said cylinder and distributing air over said cylinder, means for driving said blower for supplying air to said plenum chamber for cooling said cylinder, and a sealed compartment enclosing one side of said engine and said induction system inlet and said shroud inlet and supplying air to said induction system inlet and said shroud inlet, and an inlet for said compartment on the side of said compartment opposite said engine and receiving air for cooling and operating said engine from the side of said compartment opposite said engine.

3. A cooling system for an internal combustion engine having an air induction system having an inlet and having a crankcase and a cylinder projecting from said crankcase and receiving air from said induction system for operating said cylinder and comprising, a blower having an air inlet and an air outlet and having an axis of rotation disposed transversely to the axis of said cylinder, a shroud extending over said blower and said cylinder and being formed to provide an inlet for said blower inlet and enclosing said blower outlet and said cylinder and providing a plenum chamber between said blower and said cylinder and distributing air over said cylinder, a single means supplying air to said induction system inlet and said blower inlet, and means for driving said blower for supplying air from said supplying means to said plenum chamber for cooling said cylinder.

4. A cooling system for an internal combustion engine having an air induction system having an inlet and having a crankcase and a cylinder projecting from said crankcase and receiving air from said induction system for operating said cylinder and comprising, a blower having an air inlet and an air outlet and having an axis of rotation disposed transversely to the axis of said cylinder, a shroud extending over said blower and said cylinder and being formed to provide an inlet for said blower inlet and enclosing said blower outlet and said cylinder and providing a plenum chamber between said blower and said cylinder and distributing air over said cylinder, means disposed on said shroud and around said shroud inlet and supporting said induction system inlet, means supplying air to said induction system inlet and said blower inlet and enclosing said induction system inlet and said blower inlet, and means for driving said blower for supplying air from said supplying means to said plenum chamber for cooling said cylinders, said induction system inlet and said driving means and said blower inlet being axially aligned and disposed within said air supplying means.

References Cited in the file of this patent
UNITED STATES PATENTS

| | | |
|---|---|---|
| 2,267,423 | Reimspiess | Dec. 23, 1941 |
| 2,509,178 | Van Ranst | May 23, 1950 |
| 2,581,996 | Bachle | Jan. 8, 1952 |